US006687363B1

(12) United States Patent
Aravamudan et al.

(10) Patent No.: US 6,687,363 B1
(45) Date of Patent: Feb. 3, 2004

(54) METHOD OF DESIGNING SIGNALING NETWORKS FOR INTERNET TELEPHONY

(75) Inventors: Murali Aravamudan, Murray Hill, NJ (US); Krishnan Kumaran, Scotch Plains, NJ (US); Kajamalai Gopalaswamy Ramakrishnan, Berkeley Heights, NJ (US); Aravind Srinivasan, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/517,658

(22) Filed: Mar. 3, 2000

(51) Int. Cl.[7] ................................................. H04M 7/00
(52) U.S. Cl. ............. 379/219; 379/220.01; 379/221.01
(58) Field of Search ........................... 379/112.05, 219, 379/220.01, 221.01, 221.07; 706/59

(56) References Cited

U.S. PATENT DOCUMENTS

| | | | | |
|---|---|---|---|---|
| 4,704,724 A | * | 11/1987 | Krishnan et al. | 379/221.07 |
| 4,991,204 A | * | 2/1991 | Yamamoto et al. | 379/221.01 |
| 5,058,105 A | * | 10/1991 | Mansour et al. | 370/228 |
| 5,142,570 A | * | 8/1992 | Chaudhary et al. | 379/221.07 |
| 5,218,676 A | * | 6/1993 | Ben-Ayed et al. | 709/240 |
| 5,553,206 A | * | 9/1996 | Meshkat | 345/423 |
| 5,646,936 A | * | 7/1997 | Shah et al. | 370/228 |
| 6,086,619 A | * | 7/2000 | Hausman et al. | 703/6 |
| 6,154,736 A | * | 11/2000 | Chickering et al. | 706/59 |
| 6,331,905 B1 | * | 12/2001 | Ellinas et al. | 398/2 |
| 6,477,515 B1 | * | 11/2002 | Boroujerdi et al. | 706/14 |
| 6,614,762 B1 | * | 9/2003 | Illiadis et al. | 370/252 |

OTHER PUBLICATIONS

A. Farago, et al., "Virtual Path Network Topology Optimization Using Random Graphs", *Proc. of IEEE INFOCOM '99*, pp. 491–496 (1999).

T. A. Feo, et al., "A Greedy Randomized Adaptive Search Procedure For Maximum Independent Set", *Operations Research*, vol. 42, No. 5, pp. 860–878 (1994).

N. Alon et al., *The Probabilistic Method*, Wiley, New York, pp. 95–100, (1992).

B. Bollobas, *Random Graphs*, Academic Press, London, pp. 31–40, 152–155, 228–238 (1985).

T. Luczak, "Sparse random graphs with a given degree sequence", *Random Graphs*, Wiley, New York, vol. 2, pp. 165–182 (1992).

B. D. McKay, et al., "Uniform generation of random regular graphs of moderate degree", *Journal of Algorithms*, vol. 11, pp. 52–67 (1990).

* cited by examiner

*Primary Examiner*—Ahmad F. Matar
*Assistant Examiner*—Bing Bui
(74) *Attorney, Agent, or Firm*—Martin I. Finston

(57) ABSTRACT

A method is disclosed for designing a signaling network of call coordinators (CCs) for internet telephony. The new method can be used to design a CC network of arbitrary size that satisfies, with high probability, limitations on the maximum number of sockets per CC and on the maximum number of hops between an arbitrary pair of switches in the network. According to the disclosed method, the network of CCs is treated initially as a collection of isolated points, one point for each CC. Then, links are added between pairs of CCs, excluding pairs lying within the same switch. The links are added randomly, but with a particular probability p, which may be different for different pairs. Thus, whether a given link is added depends, in effect, upon the outcome of a loaded coin toss in which the probability of a positive outcome is p.

20 Claims, 8 Drawing Sheets

LEGEND
— ANALOG SIGNAL
--- PACKET SIGNAL
······ SIGNALLING MESSAGE

METHOD OF DESIGNING SIGNALING NETWORKS FOR INTERNET TELEPHONY

FIELD OF THE INVENTION

This invention relates to the process of call set-up in internet telephony. More particularly, the invention relates to procedures for determining how to interconnect the software switches that handle call set-up.

ART BACKGROUND

In conventional telephony, the analog voice signals that are the substance of telephone calls are delivered through a network of cables and switches referred to as the bearer network. By way of illustration, FIG. 1 shows a pair of telephones 10, 15, each connected to bearer network 20 through a respective local exchange switch 25, 30 which is, for example, a Lucent Technologies 5ESS switch. To establish a switched circuit between telephones 10 and 15 for the duration of the call, signaling messages are sent through a parallel, physical network of Signal Transfer Points (STPs). This parallel network, shown in FIG. 1 as network 35, is referred to as the signaling network. The establishment of a switched circuit is one type of call setup; specifically, it is the type of call setup performed in circuit-switched networks such as traditional telephone networks. It is a long-established requirement in conventional telephony that with 99% probability, call setup must be completed in time for a customer to hear a ring within two seconds after dialing. The actual time interval before a ring is heard is referred to as Post-Dialing Delay (PDD).

A newer kind of telephony, referred to as internet telephony, is rapidly growing in importance. In internet telephony, the substance of the telephone call is transmitted through a network of internet routers in the form of packetized signals which conform, e.g., to the TCP/IP protocol. Such a network of internet routers, referred to below as, simply, "the internet," is indicated in the figure as network 40. In internet telephony, call setup involves the establishment of an IP session instead of a switched circuit. To set-up a call, signalling messages are sent through a parallel network of software switches, such as Lucent Technologies Softswitches. A software switch network is indicated in FIG. 1 as network 45. In current implementations of internet telephony, the software switches of network 45 do not intercommunicate exclusively through dedicated hardware. Instead, they use the resources of the internet itself for intercommunication. Thus, unlike the physical signaling network of conventional telephony, the software switch of internet telephony (in current implementations) is a virtual network.

Like conventional telephony, internet telephony honors the 99% probability, two-second limit on PDD.

When a customer wishes to place an internet telephone call, he includes in the dialed number a string, referred to as a prefix, indicative of a particular provider of internet telephone service. Such a prefix typically consists of a seven-digit string included just before the seven-digit local telephone number being dialed. Thus, to the customer, the internet prefix is analogous to the seven-digit access code for long-distance carriers.

The internet prefix is interpreted at the originating local exchange switch, e.g., switch 25. In response, the call is sent to the internet and not to the conventional telephone network. As shown in FIG. 1, switch 25 sends call data directly to software switch network 45, and also to an associated Packet Voice Gateway (PVG) 50. As explained below, the PVG, in turn, sends data to internet router network 40 and to software switch network 45. Similarly, the local exchange switch at the receiving end, e.g., switch 30, receives data directly from network 45 and from an associated PVG 55. PVG 55 receives data from network 40 and from network 45. Finally, switch 30 connects to telephone 15.

Further information about the flow of signals is illustrated in FIG. 2. Elements common to FIGS. 1 and 2 bear the same reference numerals in both figures. Analog signals, represented in the figure by solid lines, flow between each telephone 10, 15 and the corresponding local exchange switch 25, 30. Analog signals also flow between each local exchange switch and a corresponding PVG 50, 55. Included among the functions of the PVG is analog-to-packet conversion. Accordingly, packet signals embodying the substance of the telephone call, represented in the figure by broken lines, flow between PVGs 50, 55 and the internet IP routers. Shown in the figure are the origination router, e.g., router 60, and the destination router, e.g., router 65.

Signaling messages, represented in the figure by dotted lines, pass among the multiple switches of the software switch network. Shown in the figure are origination and destination software switches 70 and 75. Also shown are two intermediate software switches 80 and 85. Origination software switch 70 also exchanges signaling messages with origination local exchange switch 25 and with origination PVG 50. Destination software switch 75 also exchanges signaling messages with destination local exchange switch 30 and with destination PVG 55.

Further details of the software switches are shown in FIG. 3. Elements common to FIGS. 2 and 3 bear the same reference numerals in both figures. Each software switch includes a plurality of Call Coordinators (CCs) 100 and a Device Server (DS), such as an SS7 device server. Shown in the figure are DS 90, associated with orgination software switch 70, and DS 95, associated with destination software switch 75. For simplicity of presentation, the device servers associated with the intermediate software switches are not shown in the figure.

Among its other functions, the DS within each software switch processes the call set-up strings when that switch is the origination or destination switch for a call. The CCs set up the origin and destination PVGs. The DS also performs round-robin scheduling or other load-balancing operations among the various CCs of that switch. Thus, each CC within an individual switch communicates with the DS of that switch. However, the CCs within an individual switch do not typically communicate directly with each other.

Each CC of a given software switch is desirably connected to one or more CCs of one or more other switches, such that collectively, the interconnections among all of the CCs span the entire software switch network. That is, the network should be able to transmit set-up data for a call originating at any given software switch to any other software switch via a series of hops from switch to switch through the network.

A typical world-wide network for internet telephony may have as many as 200 or more software switches. Typically, each software switch will have several tens of CCs, exemplarily about 50 CCs. Thus, even with the constraint that CCs within an individual switch do not intercommunicate, the number of possible network designs is extremely large.

An advantageous network design should satisfy certain further requirements. For example, each hop consumes some time, which may be as much as 100 ms or more. If excessive delay accumulates during a transit of the network, call set-up may not be achieved in time to satisfy the two-second limit on PDD. Therefore, it is desirable for the diameter of the network, i.e., the number of hops separating the most distant pair of CCs, to be limited to a small number, such as two hops.

Typically, the links between CCs are virtual links. Under TCP/IP and certain other protocols, for example, these links are of the kind referred to as sockets. As will be appreciated by those skilled in the art, a socket is a software construct that permits communication between computational processes. A disadvantageous property of sockets in software switches is that for each CC, delay and overhead penalties increase with the number of open sockets belonging to such CC. The delay and overhead penalties are not proportional to the number of open sockets, but instead have a rate of increase that is faster than proportionality. Thus, a second desirable feature of a CC network is that the number of links ending on a given CC (i.e., the degree of that CC) should be relatively small.

The respective requirements of small network diameter and of small degree are difficult to satisfy simultaneously, because a degree limitation inherently limits the number of short paths (i.e., paths of one or two hops) available between arbitrarily selected CC pairs.

In principle, a computational aide to designing an advantageous CC network is available in the form, for example, of an Integer Program. By solving an Integer Program, it is possible to generate a network that conforms to the stated requirements. However, the computational complexity of such a solution grows exponentially in the total number of CCs in the network. Thus, for all but very small networks, it is intractable to solve an IP at reasonable time and expense.

Thus, there has been lacking, until now, a practical method for designing a CC network of arbitrary size that satisfies the desired limitations on network diameter and on CC degree.

SUMMARY OF THE INVENTION

We have discovered a practical method for designing a CC network of arbitrary size that satisfies, with high probability, limitations on network diameter and on CC degree. In a broad aspect, our invention involves treating the network of CCs, initially, as a collection of isolated points, one point for each CC. Then, links are added between pairs of CCs, excluding fraternal pairs, i.e., pairs lying within the same switch. The links are added randomly, but with a particular probability p, which may be different for different pairs. That is, between each admissible pair (i.e., each pair not lying within the same switch), a link is either added or not added. Whether the link is added depends, in effect, upon the outcome of a loaded coin toss, in which the probability of a positive outcome is p.

We have been able to prove, mathematically, that when p assumes appropriate values, it is highly tractable to find, among alternative networks generated as described above, a network of diameter 2 whose maximum degree is substantially less than the total number n of CCs in the network. For example, with a probability that approaches 1 as n increases, no more than 2 ln n alternative networks need to be generated and searched in order to find a network of diameter 2 and maximum degree $\sqrt{2 . \ln(\ln n)}$.

In fact, in numerical simulations, we have found that as a general rule, the first network to be generated is satisfactory as to diameter and maximum degree.

In specific embodiments of the invention, the random network that has been constructed is improved further in a post-processing step. In the post-processing step, links are added between those admissible pairs that are still separated by more than two hops. The further links are added until all admissible pairs are connected by at most two hops.

Accordingly, the invention in one aspect involves performing, at least once, a step of randomly assigning edges to pairs of vertices of a graph wherein each vertex represents a node of the communication network. The random assignment is carried out such that: (i) any fraternal pair has zero probability of being assigned an edge, but all admissible pairs have a finite probability of being assigned an edge; and (ii) at least one resulting graph, denominated a low-degree graph, has a maximum degree less than 2 $\sqrt{n(\ln n)}$. The invention further includes adding edges, if any are needed, to a low-degree graph until all admissible vertex pairs of the resulting graph are connected by a path of at most two edges. The invention further includes mapping vertices of the resulting graph to nodes of the communication network.

DETAILED DESCRIPTION

The construction of a random network in accordance-with the invention is conveniently described in graph theoretic terms. In such terms, a discrete point, referred to as a vertex or node, represents each CC. Links between pairs of CCs are represented by lines, referred to as edges, that connect the corresponding vertices. The vertices are consecutively numbered. If, for example, if there are s switches and cc call coordinators per switch, then the total number n of CCs in the graph is s×cc. The parameter cc is typically a few tens, and the parameter s may be as much as several hundred. Future networks for worldwide internet telephony will typically have s of about 200 and cc of about 50.

Figure 1:
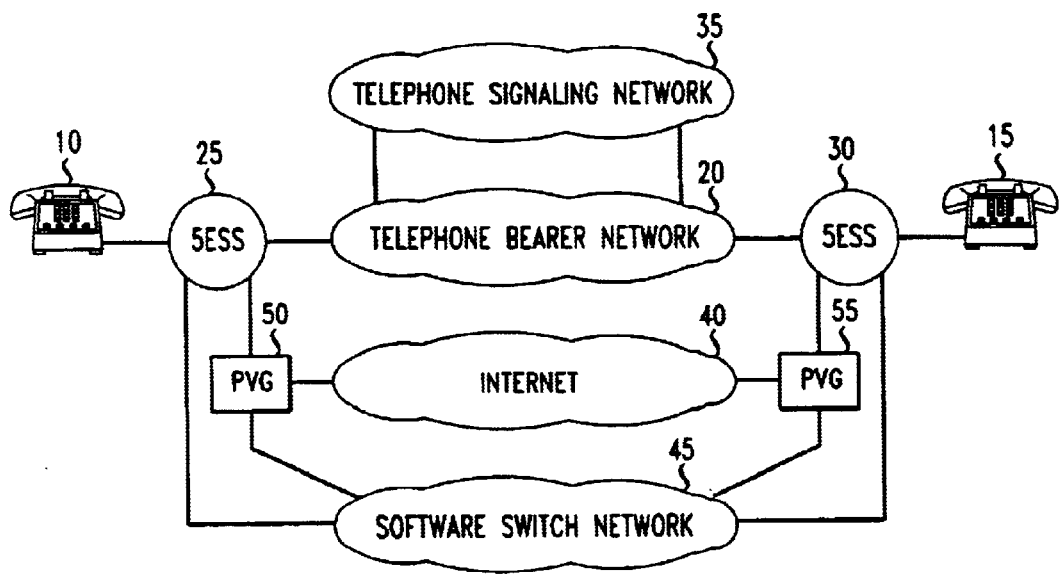
FIG. 1 is a simplified conceptual diagram of a network for conventional telephony in parallel with a network for internet telephony.
Figure 2:
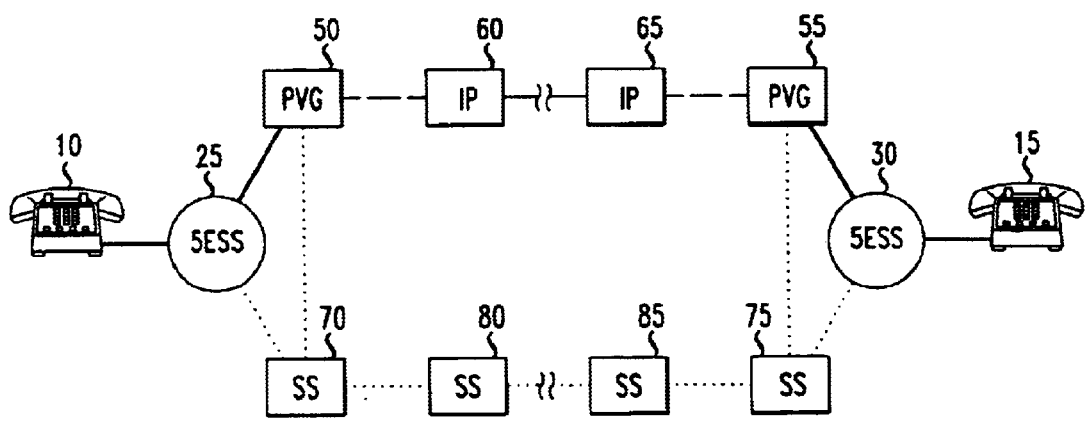
FIG. 2 is a schematic diagram illustrating signal flow in a network for internet telephony.
Figure 3:
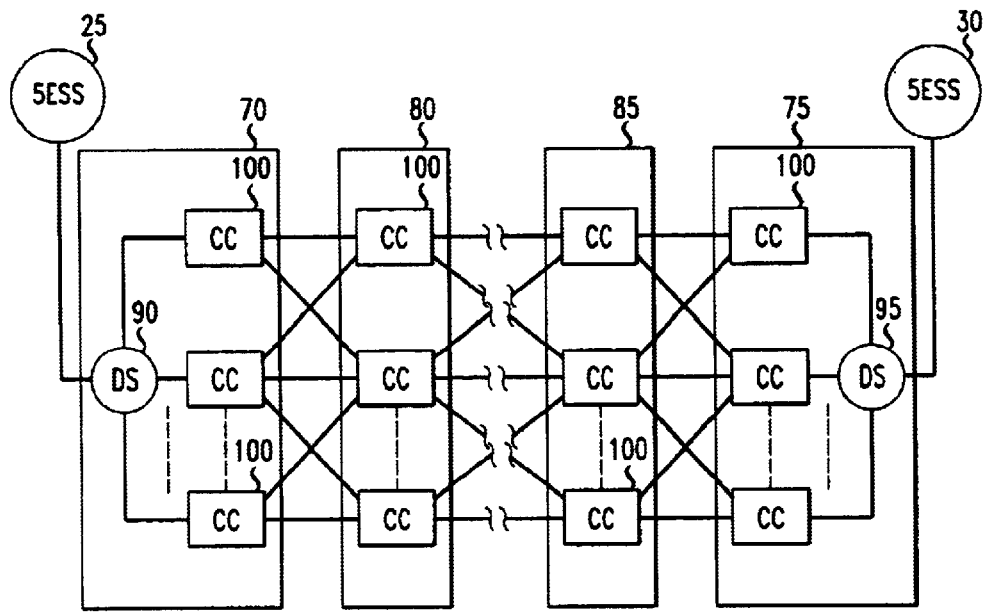
FIG. 3 is a simplified schematic diagram of a network of software switches for internet telephony.
Figure 4:
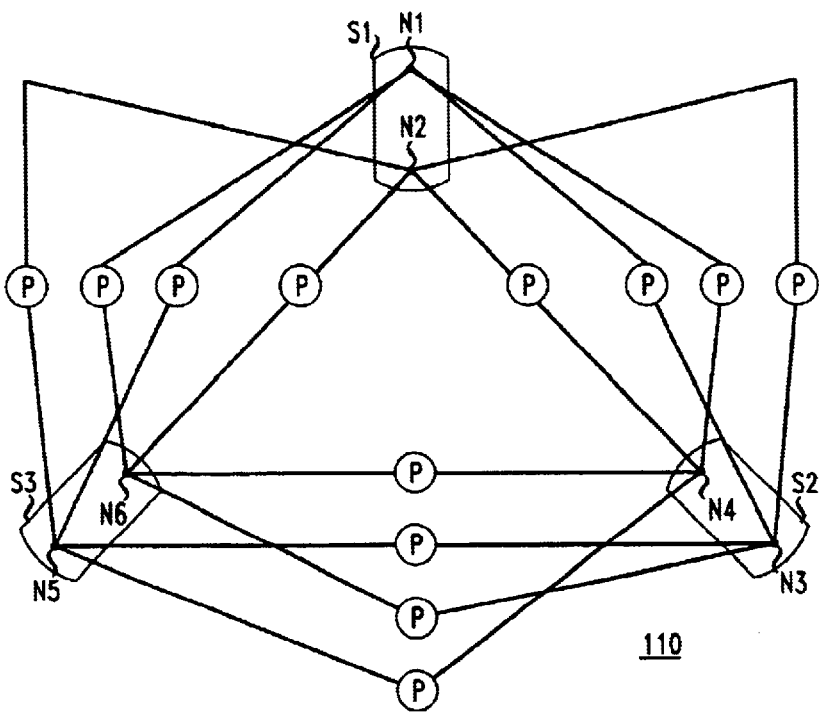
FIG. 4 is a simplified schematic diagram of a network of three software switches, each containing two call coordinators (CCs). Indicated in the figure are all possible connections between CCs, except that CCs residing in the same switch are not connected. For each possible connection, a probability is indicated, in accordance with the present invention in some embodiments.

FIG. 4, which is presented for pedagogical purposes only, is a graph representing a simplified network 110 having three switches S1, S2, S3, each having two CCs. The CCs are consecutively numbered N1, N2, . . . , N6. All possible links, numbering twelve in all, are drawn between the admissible pairs. However, a probability p is also indicated in the drawing for each link.

In accordance with a first embodiment of the invention, each of the twelve possible links is added, or not added, in accordance with a loaded coin toss whose probability of a positive outcome is p. Through mathematical analysis, we have found that one appropriate value for p is $[2 (\ln n)/n]^{1/2}$. We have mathematically proven that for such p and for large n, e.g. n on the order of 100 or more, it is very likely that no admissible pair of vertices in the resulting network will be separated by more than two hops. Moreover, we have proven that for such p and n, it is also very likely that no vertex will have a degree greater than $(2n \ln n)^{1/2}$.

More particularly, we have proven that if $2 \ln n$ alternative networks are randomly generated (the preceding number is rounded to the next lower integer), the probability will be at least $$1 - \frac{1}{n}$$

that at least one of the alternative networks will have both: (i) a diameter of two hops; and (ii) a maximum degree that is at most slightly larger than $(2n \ln n)^{1/2}$, for example, a maximum degree at most $(2.1n \ln n)^{1/2}$. Significantly, the probability of satisfying both of conditions (i) and (ii) approaches unity as n increases. In a series of numerical simulations, we have found that as a practical matter, the very first network generated will very often satisfy conditions (i) and (ii).

Moreover, if p is increased to a value slightly greater than $[2 (\ln n)/n]^{1/2}$, the probability that any given generated network satisfies conditions (i) and (ii) can also be made to approach unity as n increases. For example, if p is set to $[2.05(\ln n) / n]^{1/2}$, the corresponding probability will be at least $$1 - \frac{1}{n^{0.05}}.$$

In practice, still larger values of p will also be useful. In fact, p-values as high as $[2.1 (\ln n)/n]^{1/2}$ will generally be effective in this regard, and even p-values as high as $3[(\ln n)/n]^{1/2}$ or more will be useful in at least some cases. However, as p increases, the average number of edges per vertex will increase. In practical terms, this means that the average number of sockets per CC will increase. As noted, increasing the number of sockets tends to drive up delay and other penalties in the operation of the signaling network. Thus, the greatest benefit is to be gained if the maximum degree is kept relatively small, exemplarily below $2 (n \ln n)^{1/2}$. With a useful degree of confidence, the probability p can be increased to as much as about $[3.8 (\ln n)/n]^{1/2}$ while still maintaining the maximum degree within such a range.

In practice, somewhat smaller values of p will also be useful. However, as p is reduced, the amount of connectivity between CCs decreases. At some decreasing value of p, there will no longer be confidence that two hops or less connect each admissible pair of CCs. Some shortfall in connectivity can be rectified by the post-processing step to be described below. However, when the connections between CCs are very sparse, the post-processing step will tend to increase connectivity at the cost of an excessive increase in the average number of sockets per CC. With a useful degree of confidence, the probability p can be decreased to little as about $[1.7 (\ln n)/n]^{1/2}$ while still providing an advantageous degree of network connectivity.

Figure 5:
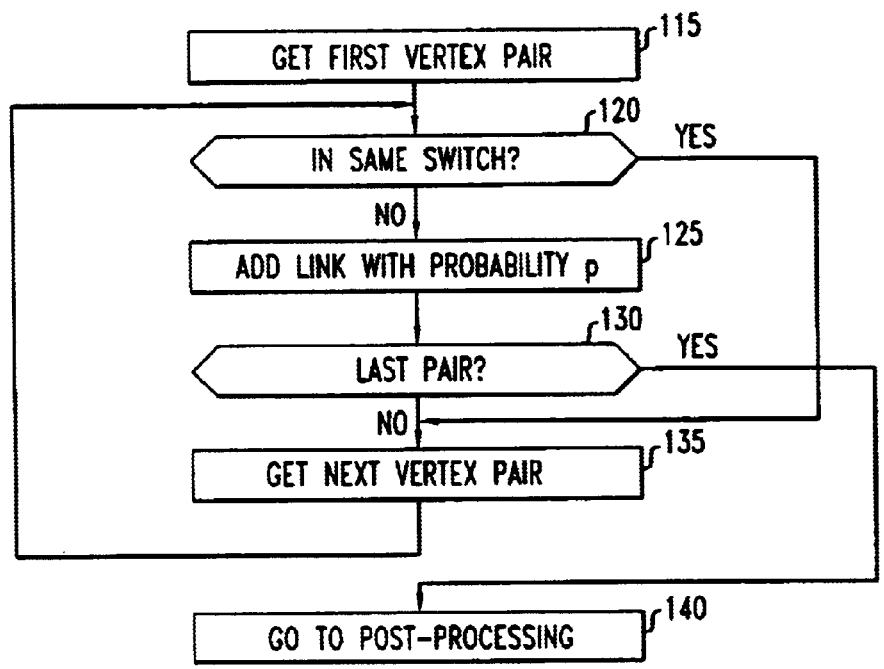
FIG. 5 is a flowchart of an exemplary procedure for generating a network of CCs according to the invention in some embodiments.

FIG. 5 is a flowchart of an exemplary procedure for building the random network. It should be noted that this flowchart is meant to be illustrative only, and not limiting, and that numerous alternative procedures will be apparent to those skilled in the art and are envisaged as falling within the scope of the invention. As indicated at blocks 115 and 135 of the figure, each vertex pair is obtained in turn. If the current pair is admissible, as determined at block 120, then a link is added with probability p, as indicated at block 125. After the last pair is processed, as determined at block 130, the procedure exits to, e.g., a post-processing phase as indicated at block 140 and described below.

A network-building procedure according to an alternative embodiment of the invention is conveniently described with reference to FIG. 6. The illustrative network 145 of FIG. 6 comprises four switches SI, S2, S3, S4, and eight CCs consecutively numbered N1, N2, . . . , N8. The first pair N1, N2 belongs to S1, the second pair N3, N4 to S2, the third pair N5, N6 to S3, and the fourth pair N7, N8 to S4. Thus, the CCs are indexed by the integers 1–8. A specified number d' of distinct random permutations of the CC indices are generated. An example for d'=2 is presented in Table 1, below:

TABLE 1

| index | permutation 1 | permutation 2 |
|-------|---------------|---------------|
| 1 | 5 | 3 |
| 2 | 3 | 4 |
| 3 | 6 | 2 |
| 4 | 8 | 7 |
| 5 | 2 | 8 |
| 6 | 4 | 1 |
| 7 | 1 | 6 |
| 8 | (7) | 5 |

As shown in the figure, each node identified by an original index is linked directly to the nodes identified by the two corresponding permuted indices, unless the resulting link would connect an inadmissible pair. Such an inadmissible pair is N8, N7, which results by pairing N8 with its image under the first permutation. In Table 1, the occurrence of the index 7 in the column corresponding to the first permutation is enclosed in parentheses to indicate that an inadmissible pair is formed.

Figure 6:
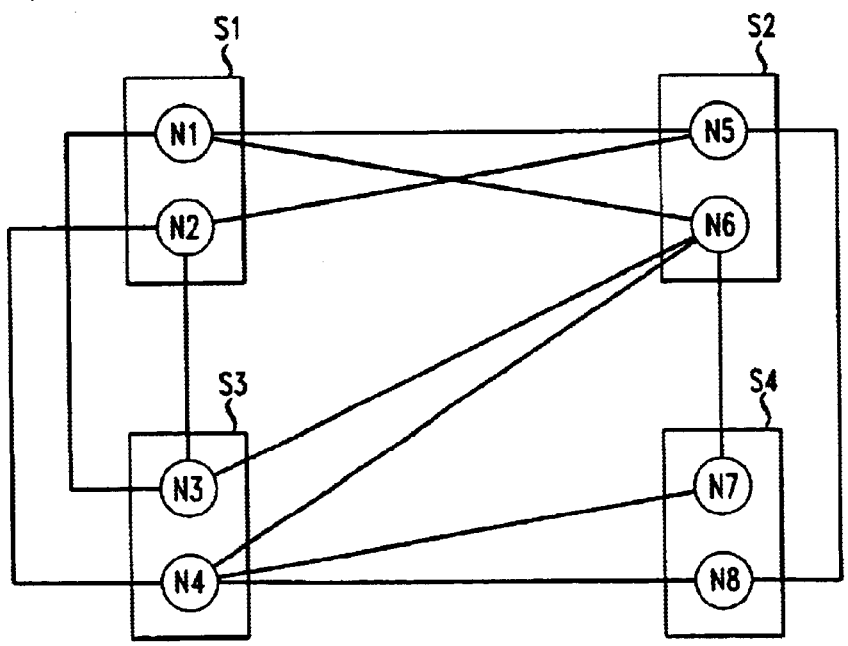
FIG. 6 is a simplified schematic diagram of a network of four software switches, each containing two CCs, presented as an aide to understanding an alternative network-generating procedure according to the invention in some embodiments.

Inspection of FIG. 6 shows that the maximum degree is four, and that such degree occurs for nodes N4 and N6 only. Inspection of FIG. 6 also shows that except for nodes N3 and N5, each node lies within at most two hops of each other node that forms with it an admissible pair. However, N3 is three hops distant from N8, and N5 is three hops distant from N7. These distances can be reduced by adding links in a post-processing procedure to be described below.

More generally, the number d' is advantageously taken to be less than the number $d=(2n \ln n)^{1/2}$, but not less than, e.g., 0.1 d. We have found a useful value for d' to be, for example, the greatest integer less than or equal to 0.45 d. The network constructed according to the procedure described here will, with certainty, have a maximum degree of no more than 2 d'.

Figure 7:
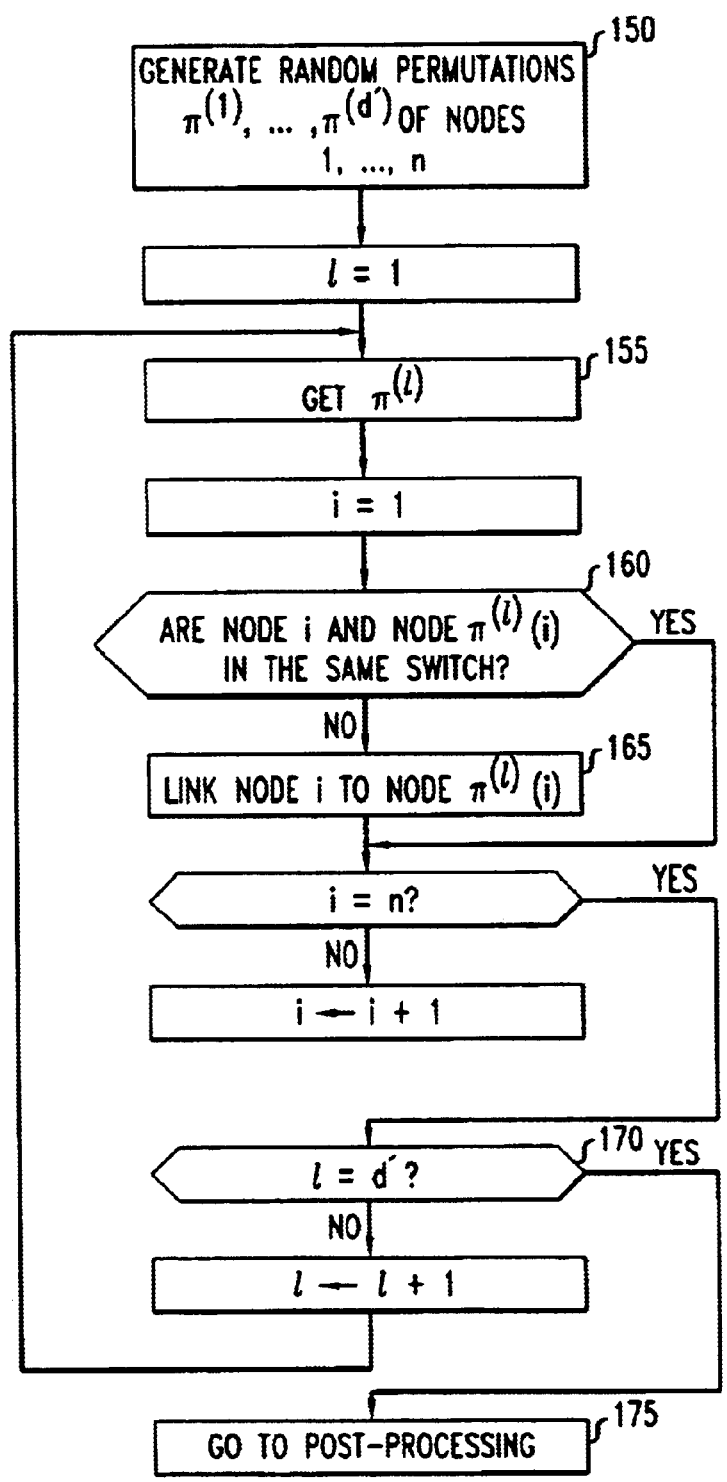
FIG. 7 is a flowchart of the network-generation procedure illustrated by FIG. 6.

FIG. 7 is a flowchart of an exemplary procedure for constructing a random graph according to permutations of the nodes. Like FIG. 5, FIG. 7 is meant to be illustrative, and is not meant to exclude from the scope of the invention alternative procedures for achieving essentially the same end result.

As indicated at block 150 of the figure, d' random permutations of the n nodes are generated. The permutations are here denominated $\pi^{(1)}, \ldots, \pi^{(d')}$. As indicated at block 155, each permutation $\pi^{(l)}$ is obtained in turn, l=1, . . . , d'. At block 160, a determination is made, for each node in turn, whether the current node and its image under the current permutation form an admissible pair. If they do form an admissible pair, they are connected by drawing an edge between them, as indicated at block 165. After the last permutation has been processed, as determined by the test at block 170, the procedure exits to a post-processing phase as indicated at block 175.

The post-processing phase will now be described with reference to the flowchart of FIG. 8, which is meant to be illustrative and not to exclude alternate procedures from the scope of the invention. Because the parameter d' in the procedure of FIG. 7 is designed to provide a moderate shortfall of connectivity between the nodes, it is especially useful in that context to employ a post-processing procedure to supply additional connectivity. However, the post-processing procedure will also be useful in combination with at least some applications of the network-construction procedure of FIG. 5, particularly when the probability p is set to relatively low values.

Figure 8:
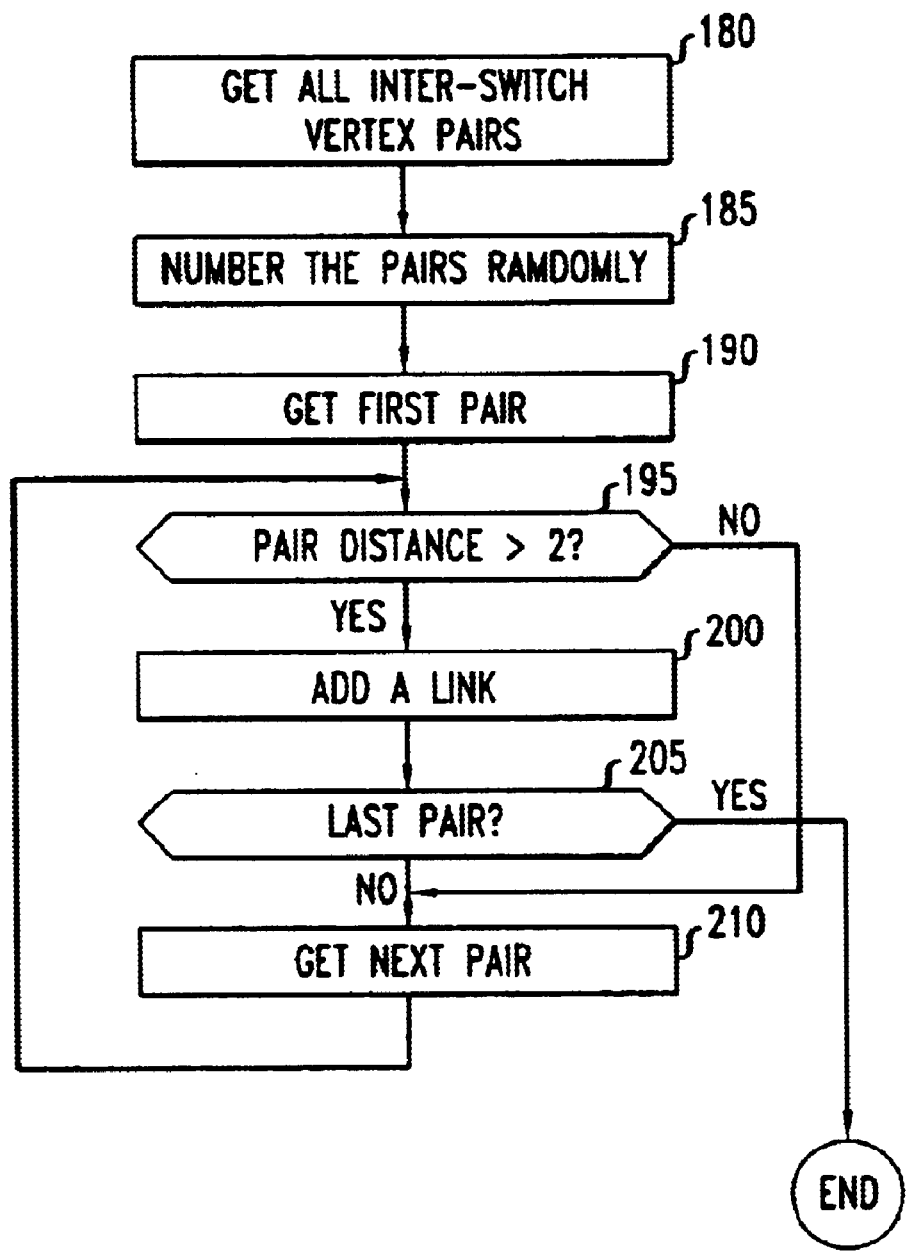
FIG. 8 is a flowchart of a post-processing procedure, according to the invention in some embodiments, for adding links to a network generated by the procedure of FIG. 5 or of FIG. 7.

Turning now to FIG. 8, each admissible pair of vertices is obtained (block 180), and the respective pairs are numbered in random order (block 185). Each admissible pair is obtained in turn (blocks 190 and 210). For each pair, a determination is made (block 195) whether more than two hops are required to travel through the network from one member of the pair to the other. The least number of hops required to travel from one member of the pair to the other is here denominated the pair distance. If the pair distance is greater than two, a new edge is added (block 200), directly connecting the members of the pair. The procedure ends after the last pair has been processed, as determined at block 205.

It should be noted that each time a new edge is added at an iteration of block 200, the distances between other node pairs may be reduced. In particular, the new edge added between, e.g., nodes A and B will assure a two-hop path between node A and each node directly connected to node B. Similarly, the new edge will assure a two-hop path between node B and each node directly connected to node A. Thus, adding an edge between the current vertex pair may affect the outcome of test 195 when it is applied to subsequent vertex pairs.

It should also be noted that the node-pair randomization of block 185 is useful because it tends to prevent a concentration of added edges in any one particular part of the network. As a consequence, it reduces the likelihood that an excessive number of sockets will be added to any one call coordinator.

The network-construction procedures described above lead to the best results when the amount of traffic demand is homogeneous, i.e., when it is the same between all pairs of switches. When demand is not homogeneous, it is useful to construct the network according to a procedure that is sensitive to the individual demands between pairs of switches. For example, the total demand for call set-ups between each pair of switches A, B may be divided equally among all pairs of CCs that draw one CC from switch A and one CC from switch B. All of the resulting demands between pairs (i,j) of CCs can be expressed as a symmetric demand matrix of respective elements $d_{ij}$. We assume here that all of the sockets are bidirectional, i.e., that they are fully duplex. Those skilled in the art will appreciate that the methods to be described here can readily be extended to the asymmetric case.

Figure 9:
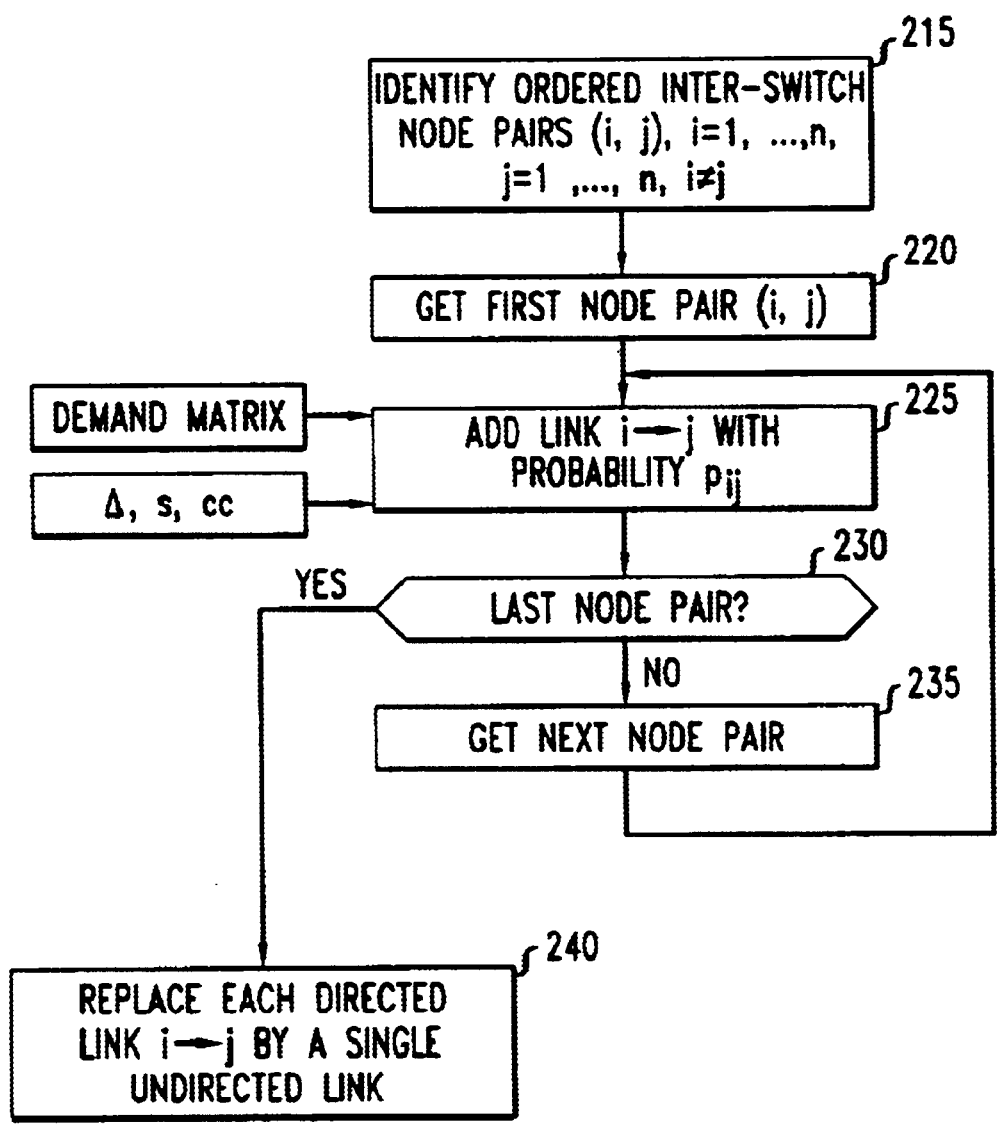
FIG. 9 is a flowchart of a demand-sensitive procedure for network generation according to the invention in some embodiments.

FIG. 9 is a flowchart of an exemplary procedure for constructing a network having average degree close to A and a variation of degree among the nodes that is sensitive to demand. The parameter A can be set arbitrarily. To assure that there will be sufficient aconnectivity, it is preferable not to set $\Delta$ below about $\sqrt{n \ln n}$. To maintain the average degree within practical limits, it is preferable not to set $\Delta$ above about $3\sqrt{n \ln n}$. As for preceding figures, FIG. 9 is meant to be illustrative only, and not limiting as to the scope of the invention.

Turning now to FIG. 9, the ordered pairs of nodes (i,j) are identified (block 215), wherein demand is directed from node i to node j. Only admissible pairs are considered. As indicated at blocks 220 and 235, each admissible pair is considered in turn.

For each ordered pair (i,j), a directed link i→j is independently placed (block 225) from node i to node j with probability $$p_{ij} = \frac{\Delta}{2(s-1)cc} \cdot \frac{d_{ij}}{\sum_k d_{ik}}.$$

The summation in the denominator of the preceding expression is carried out over all demands directed outward from node i. Thus, the term $$\frac{d_{ij}}{\sum_k d_{ik}}$$

represents the fractional demand directed from node i to node j relative to the total demand from node i. As indicated in the figure, the calculation of probability $p_{ij}$ takes into account the pertinent element of the demand matrix, the value of the parameter $\Delta$, the switch count s, and the number cc of call coordinators per switch.

After the last directed node pair has been processed, as determined at block 230, each directed link that has been emplaced is replaced by a single undirected link (block 240). Thus, for a given node pair (i,j), if respective iterations of block 225 have resulted in the emplacement of both directed link i→j and directed link j→i, a single undirected link is substituted for both directed links.

The procedure of FIG. 9 is useful for constructing a network that is responsive to the distribution of demand. However, some distributions of demand may lead to network designs in which the degree of some vertices is excessive. Moreover, some distributions of demand may lead to network designs in which some vertices are separated by more than two hops. In order to enjoy the advantages of demand sensitivity while also adhering to desired limits on degree and pair distance, we have found it useful to employ a hybrid procedure. The hybrid procedure combines aspects of the procedure of FIG. 9, which we here denominate DEM, with aspects of the procedure of FIG. 5 or the procedure of FIG. 7, both of which are specific embodiments of an approach we here denominate UNIF.

Figure 10:
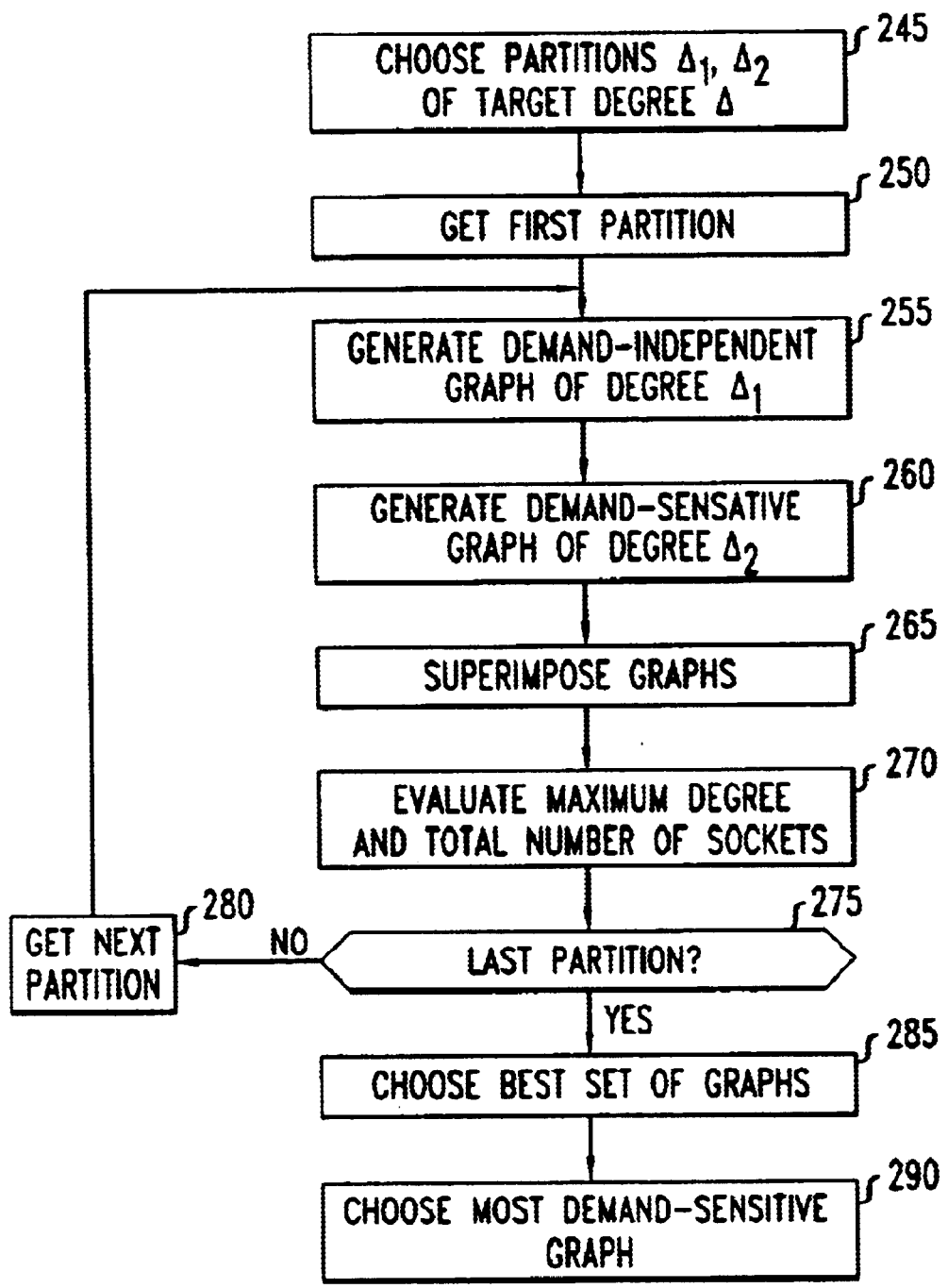
FIG. 10 is a flowchart of a hybrid method of network generation, according to the invention in some embodiments.

As indicated at block 245 of FIG. 10, there is chosen a set of partitions of the desired average degree $\Delta$ as a sum of non-negative integers $\Delta_1$ and $\Delta_2$: $\Delta=\Delta_1+\Delta_2$. Typically, all $\Delta+1$ possible partitions are chosen. However, smaller sets may also be chosen.

As indicated at blocks 250 and 280, each partition is considered in turn. For each partition, UNIF is used to generate a demand-independent sub-network of average degree $\Delta_1$ (block 255) and DEM is used to generate a demand-sensitive sub-network of average degree $\Delta_2$ (block 260). The two generated sub-networks are superposed to create a single network that includes all of the edges of both sub-networks (block 265). Redundant edges appear only once in the combined network.

The combined network is evaluated at block 270 for appropriate figures of merit, such as the maximum degree and the total number of sockets.

After the last partition has been processed as determined at block 275, one or more combined networks are selected as having the best figures of merit (block 285). Exemplarily, such a selection would begin by choosing the networks having diameter at most 2 and least maximum degree. Of the remaining networks, those would be chosen having the least total number of sockets. If more than one combined network has been selected, the selection is narrowed to a single network (block 290) by choosing, e.g., that network having the greatest demand-sensitivity, i.e., that having the highest $\Delta_2$.

As noted, the network-construction procedures belonging to the UNIF category produce a network design that is insensitive to individual demand levels between node pairs. Because individual demands are not considered in generating the network, there is no unique association between an abstract switch (i.e., a grouping of same-switch nodes) of the resulting network and a physical switch at a particular location. Instead, the designed network remains at an abstract level, and various mappings are possible of abstract switches to physical switches. In particular, it is possible to make a mapping that assigns abstract switch pairs of relatively high interconnectivity to physical switch pairs of relatively high demand. In this way, some further degree of load-balancing is achieved in the network.

One measure of interconnectivity between a pair (i,j) of switches is the connectivity coefficient $c_{ij}$, which is a weighted sum of the number of direct edges between the two switches and the number of two-hop paths between the two switches. Optionally, the direct edge count can be given a larger weight to reflect the fact that direct edges are more desirable because, in general, they will have higher free capacities and smaller delays. One relative measure of interconnectivity is the pair load coefficient $c_{ij}/d_{ij}$. The sum, over the network, of all pair load coefficients is a measure of the average number of paths per unit of demand. We denominate this measure the total load measure. Network designs having relatively high values of the total load measure have a greater likelihood that switch pairs with high demands have been given relatively high path diversity.

If the abstract switches are numbered from 1 to s, and if the physical switches are likewise numbered from 1 to s, then each of the s! possible assignments of abstract switches to physical switches can be characterized as a respective permutation of the integers 1 to s. According to each such assignment, each abstract switch i is assigned to the physical switch whose index is the image of i under the pertinent permutation. Each permutation can be characterized by a set of $s^2$ indicator variables $x_{ip}$ having the property that $x_{ip}$ equals 1 if abstract switch i is assigned to physical switch p, and $x_{ip}$ equals zero otherwise. Taken together, the indicator variables form a matrix x. A network-wide coditional load measure £(x) can be defined by $$£(x) = \sum_{i,p,j\neq i,q\neq p} \frac{c_{ij}}{d_{pq}} x_{ip} x_{jq}.$$

Figure 11:
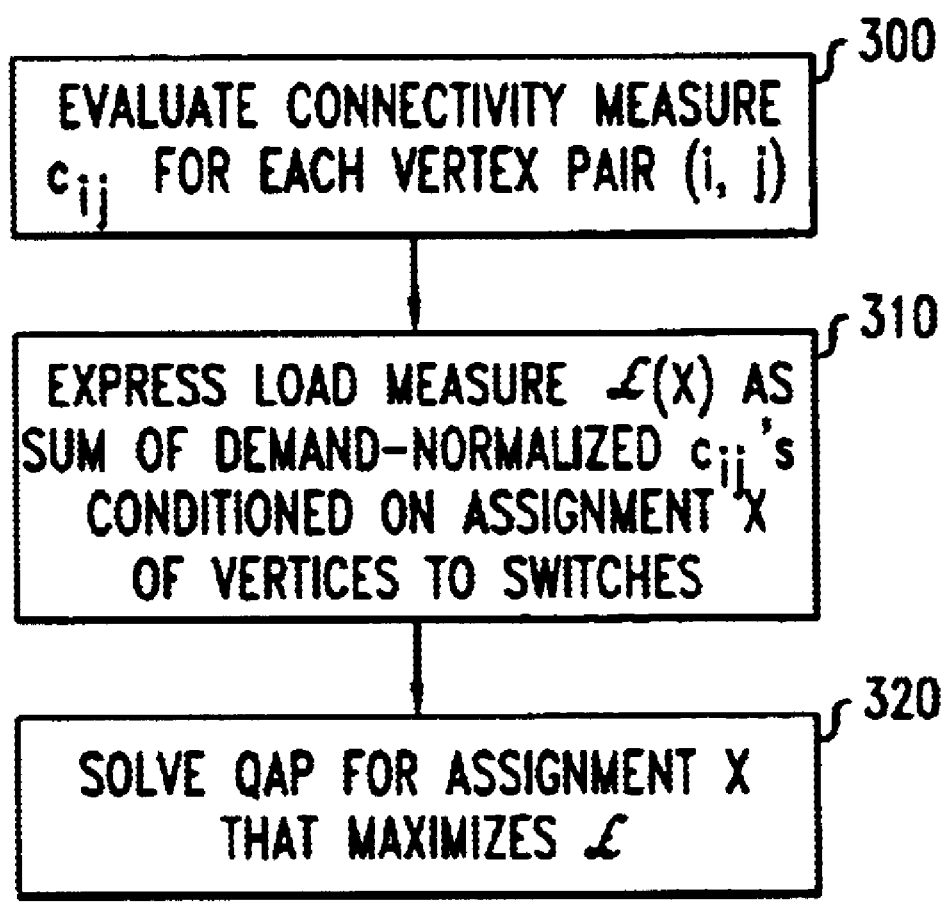
FIG. 11 is a flowchart of a procedure for assigning physical identities to abstract switches in a load-sensitive manner, according to the invention in some embodiments.

The flowchart of FIG. 11 shows a procedure for using the conditional load measure to find an assignment that enjoys a relatively high degree of load balancing. As for previous figures, FIG. 11 is intended to be illustrative only, and not to limit the scope of the invention. With reference to FIG. 11, at block 300 the pair load coefficient $c_{ij}/d_{ij}$ is computed for each vertex pair (i,j). At block 310, the conditional load measure £(x) is formulated. The value of £(x) depends upon the particular assignment x of abstract switches to physical switches. It is a standard problem in integer programming to find an assignment x that maximizes an expression of the form assumed by £(x). That standard problem is known as the Quadratic Assignment Problem (QAP). Although the QAP is an NP-hard problem, and thus computationally intractable when the number of variables is large, efficient heuristics are available for obtaining approximate solutions. One such heuristic is a technique known as Greedy Randomized Adaptive Search Procedure (GRASP), which is described, e.g., in T. A. Feo et al., "A Greedy Randomized Adaptive Search Procedure for Maximum Independent Set," *Operations Research* 42 (1994) 860–878.

Turning again to FIG. 11, at block 320 the QAP is solved using, e.g., an appropriate heuristic to obtain an assignment x that maximizes, or approximately maximizes, £(x).

EXAMPLE

We performed a series of numerical simulations employing the procedures described above to design networks of various sizes. Table 1 shows results obtained using the above-described hybrid procedure that combines aspects of both DEM and UNIF. For the simulations whose results are shown in Table 1, we set the number cc of call coordinators per switch at 50, and we generated pairwise demands $d_{ij}$ uniformly at random in the range [1, 100]. We found that even for a network size n=10000, results were obtained within an hour or so using a commercially available computer workstation. For each simulation, Table 1 lists the number s of switches, the number n of nodes (n=s×cc), and the maximum, average, and minimum degrees of the call coordinators.

Table 2 shows results obtained using the hybrid procedure and also incorporating the solution of a QAP problem to assign physical identities to abstract switches in a load-sensitive manner. For the simulations whose results are shown in Table 2, we modeled a network of 65 switches, using actual measured demands between switch pairs of a real-life, 65-switch network.

TABLE 1

| Expt. No. | s | n | Max. Deg. | Ave. Deg. | Min. Deg. |
|---|---|---|---|---|---|
| 1 | 10 | 500 | 52 | 46.51 | 40 |
| 2 | 20 | 1000 | 75 | 68.90 | 60 |
| 3 | 30 | 1500 | 93 | 86.93 | 76 |
| 4 | 40 | 2000 | 109 | 101.86 | 89 |
| 5 | 50 | 2500 | 124 | 115.86 | 101 |
| 6 | 100 | 5000 | 174 | 168.54 | 157 |
| 7 | 200 | 10000 | 257 | 247.77 | 241 |

TABLE 2

| Expt. No. | cc | Max. Deg. | Ave. Deg. | Min. Deg. |
|---|---|---|---|---|
| 1 | 10 | 56 | 54.35 | 53 |
| 2 | 20 | 86 | 80.38 | 73 |
| 3 | 30 | 106 | 100.41 | 92 |
| 4 | 40 | 126 | 117.92 | 104 |
| 5 | 50 | 142 | 133.50 | 119 |

The invention claimed is:

1. A method for designating links between nodes of a communication network of the kind that includes n nodes, n a positive integer, a plurality of switches, each switch containing some of the n nodes, and links connecting some pairs of the nodes, the method comprising:

(a) at least once, performing a random assignment of edges to pairs of vertices of a graph wherein each vertex represents a node of the communication network, the random assignment carried out such that: (i) any vertex pair, denominated a fraternal pair, whose corresponding nodes reside within the same switch has zero probability of being assigned an edge, but all other vertex pairs, denominated admissible pairs, have a finite probability of being assigned an edge; and (ii) at least one resulting graph, denominated a low-degree graph, has a maximum degree less than $2\sqrt{n(\ln n)}$;

(b) adding edges, if any are needed, to a low-degree graph until all admissible vertex pairs of the resulting graph are connected by a path of at most two edges; and (c) mapping vertices of the resulting graph to nodes of the communication network.

2. The method of claim 1, wherein the finite probability of assigning an edge to a vertex pair, denominated the link probability p, is at most $\sqrt{3.8(\ln n)/n}$.

3. The method of claim 2, wherein p is approximately $\sqrt{2(\ln n)/n}$.

4. The method of claim 2, wherein p is at least about $\sqrt{1.7(\ln n)/n}$ but not more than about $\sqrt{3.8(\ln n)/n}$.

5. The method of claim 1, wherein a low-degree graph is accepted for mapping vertices thereof to nodes of the communication network only if, after step (a) but before step (b), the maximum degree of said graph is less than about $\sqrt{2n(\ln n)}$.

6. The method of claim 1, wherein the random assignments of edges to vertex pairs are carried out by:

taking, in turn, each of the admissible vertex pairs; and making a random decision to assign or not to assign an edge to such pair.

7. The method of claim 1, wherein the random assignments of edges to vertex pairs are carried out by:

performing one or more random permutations of the vertices; and assigning an edge between each vertex and its image or images under said permutation or permutations, excluding edges between fraternal pairs.

8. The method of claim 7, wherein the number d' of random permutations is at least about $0.1\sqrt{2n(\ln n)}$, but not more than about $\sqrt{2n(\ln n)}$.

9. The method of claim 7, wherein the number d' of random permutations is approximately $0.45\sqrt{2n(\ln n)}$.

10. The method of claim 1, wherein, in step (b), edges are added to a low-degree graph by, for each admissible pair in turn:

determining whether a pair distance of more than two hops separates the pair; and if the pair distance exceeds two hops, adding an edge between the pair.

11. The method of claim 10, wherein the turn of each admissible pair is determined by a random ordering of the admissible pairs.

12. The method of claim 1, wherein a link probability p of assigning an edge to each admissible vertex pair is derived from a measure of traffic demand between the nodes represented by said vertex pair.

13. The method of claim 12, wherein:

for each admissible pair of vertices i and j, a directed link is assigned with probability $p_{ij}$ proportional to the fractional demand directed from the corresponding node i to the corresponding node j, relative to the total demand from said node i; and after the last said directed link is assigned, each directed link or pair of directed links assigned between a pair of vertices is replaced by a single undirected link.

14. The method of claim 13, wherein each probability $P_{ij}$ is related to the corresponding fractional demand through a proportionality factor $$\frac{\Delta}{2(s-1)cc},$$

wherein s is the number of switches in the network, cc is the number of nodes per switch, and $\Delta$ is a desired average degree of the resulting network.

15. The method of claim 1, wherein:

a first random assignment of edges to vertex pairs is carried out such that the link probability p of assigning an edge between each admissible pair is independent of traffic demands, said first random assignment leading to a first sub-graph;

a second random assignment of edges to vertex pairs is carried out such that the link probability p of assigning an edge between each admissible pair is derived from a measure of traffic demand between the nodes represented by said vertex pair, said second random assignment leading to a second sub-graph; and a composite graph is constructed by assigning each edge that is in the first sub-graph or in the second sub-graph.

16. The method of claim 15, wherein a desired average degree $\Delta$ of the resulting composite graph is partitioned as a sum of a first sub-degree $\Delta_1$ and a second sub-degree $\Delta_2$, and the first and second random edge assignments are carried out such that the degrees of the resulting first and second sub-graphs will be approximately $\Delta_1$ and $\Delta_2$, respectively.

17. The method of claim 16, wherein two or more composite graphs are constructed, each resulting from a different partition of the desired average degree, and the method further comprises selecting one composite graph.

18. The method of claim 17, wherein the selection of a composite graph comprises:

culling those composite graphs in which every admissible pair is connected by no more than two hops, and in which the maximum degree is least; and if two or more composite graphs have been culled, selecting that graph having the greatest value of $\Delta_2$.

19. The method of claim 1, wherein:

an abstract switch is defined as a set of all vertices of the graph whose corresponding nodes of the network will be mapped to the same network switch;

and (c) comprises mapping abstract switches to network switches such that an average measure of inter-switch connectivity per unit of inter-switch demand is made relatively high.

20. The method of claim 19, wherein the average measure of inter-switch connectivity per unit of inter-switch demand is made relatively high by solving a quadratic assignment problem (QAP) and mapping the abstract switches to the network switches in accordance with the solution to the QAP.

* * * * *